3,427,299
ETHYLENE POLYMERIZATION
Erik Tornqvist, Roselle, N.J., assignor to Esso Research and Engineering Company, a corporation of Delaware
No Drawing. Filed Oct. 6, 1965, Ser. No. 493,553
U.S. Cl. 260—94.9  10 Claims
Int. Cl. C08f 1/42, 3/06

ABSTRACT OF THE DISCLOSURE

Ethylene is polymerized in the presence of a catalyst system made up of a titanium halide and a cocatalyst system formed by dry ball milling aluminum, aluminum choride, and an ammonium halide.

---

This invention relates to improved catalyst for the polymerization of ethylene. More particularly, it relates to a process wherein ethylene is polymerized in the presence of a catalyst system made up of a titanium halide and a cocatalyst formed by milling aluminum chloride, aluminum powder and an ammonium halide.

The use of the so-called Fischer catalyst system of aluminum metal, aluminum chloride, and a transition metal tetrahalide, particularly titanium and vanadium tetrachlorides for the polymerization of ethylene to solid polymers is well known. Additionally, the use of an ammonium halide in conjunction with the Fischer catalyst system has also been disclosed in U.S. Patent 3,203,946. According to the teachings of this patent, minor amounts of ammonium halide may be added directly to the polymerization reactor after the addition of the other catalyst components to increase the molecular weight and diminish the melt index of the ethylene polymers formed. If properly employed, addition of an ammonium halide directly to the milled or unmilled components of the catalyst system contained in the reactor, may result in an increase in the molecular weight and a reduction in the melt index of the polyethylene formed with a given catalyst system. However, the use of ammonium halide addition directly to the polymerization reactor often produces erratic results in that the molecular weight and melt index of the polyethylene and more importantly the catalyst efficiency of the system varies widely from run to run.

Now, in accordance with the present invention, it has been surprisingly discovered that highly reproducible results and extremely high catalyst efficiencies can be obtained with an ammonium halide modified Fischer catalyst system by rigorously milling together at least a portion of the aluminum and aluminum chloride catalyst components with the ammonium halide reagent prior to their introduction into the reaction system rather than adding the ammonium halide directly to the polymerization system. While not being limited or bound to any particular explanation of the reaction mechanism, it is believed that by ball milling the ammonium halide with the other two aluminum components of the catalyst system the ammonium halide during the course of ball milling, is complexed with the aluminum choride and possibly causes the formation of aluminum-hydrogen bonds according to Equation I below wherein $NH_4Cl$ is used as the reagent:

(I) 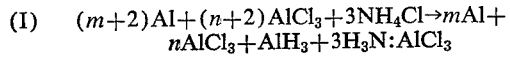

The polyethylene produced with the catalyst of this invention exhibits a molecular weight range of 100,000 to 1,000,000 or even higher (as determined by intrinsic viscosity measurements and applying the Chiang equation—Journal of Polymer Science 36, 91 (1959)) and a melt index of about 10 to 0.1 as determined by ASTM method D1238–62T. Catalyst efficiencies obtained with the process of this invention vary from about 150 to about 300 g. polymer per g. of transition metal tetrahalide which is considerably higher than those normally secured with or without direct addition of an ammonium halide to the dilute polymerization system.

The components of the catalyst in addition to the ammonium halide are used in the proportion of 1 to 12 moles, preferably 1 to 4 moles of aluminum and 0.1 to 3 moles and preferably 0.3 to 2 moles of aluminum chloride per mole of transition metal tetrahalide. The ammonium halide is employed in an amount of from 10 to 500, preferably 25 to 200 mg. per gram of total aluminum and transition metal catalyst. The most useful ammonium halide reagents are ammonium chloride and ammonium bromide. Ammonium chloride is preferred for use herein as it is readily available in large quantities at very low cost.

As stated previously, the aluminum, aluminum choride and ammonium halide are first rigorously milled together prior to their introduction into the polymerization system. The milling operation involving the aluminum, aluminum chloride and ammonium halide is desirably conducted in the absence of a diluent; however, diluents may be used. The presence of a diluent during grinding operations generally serves to diminish grinding efficiency thus making a longer period of grinding necessary for obtaining the desired degree of reagent contact and attrition. The milling process is conducted by placing the catalyst components in a ball mill, a pebble mill or other suitable grinding device and then milling the catalyst components preferably in the absence of diluents in an inert atmosphere, such as nitrogen or argon that is substantially free of oxygen and water vapor for a period of time sufficient to substantially attrite the aluminum chloride and aluminum powder. The optimum time period for the dry milling operation depends in general upon the efficiency of the equipment used. To obtain a catalyst powder within the size range of from about 0.1 to 20 microns, milling times of from about 0.2 hour to 30 days can be used. However, milling times ranging from 0.2 to 10 days will be more common. The time period most suitable for any given milling equipment can, of course, be easily determined by routine experimentation.

The pressure at which the milling operation is conducted is not critical; however, the temperature used should be well below the melting or decomposition points of the individual catalyst components so as to prevent fusion or undesirable side reactions.

The grinding operation can be conducted either as a batch or as a continuous process. While the desired attrition and intimate contacting of the catalyst components may be obtained by use of tight steel rolls or jet impact attrition, the use of steel ball milling is preferred as intimate contacting is desired. In ball milling operations utilizing either conventional ball mills or swinging mills, it is advantageous to use steel balls or some other suitable high density grinding media having a specific gravity of at least 7. However, less dense grinding media such as flint pebbles can also be used for obtaining severely attrited intimately contacted catalyst compositions if longer milling periods are used. Generally, the balls used should be large enough in diameter to give high shearing intensity; however, the size of the balls is not critical since smaller balls give more contact points. Thus, in laboratory ball mills having a volume of from about 1 to 10 liters, one may advantageously use steel balls of ¼ to 1″ in diameter, while in commercial operations larger sizes, such as up to 2″ in diameter, are usually preferred.

Following the grinding operation, the intimately mixed and severely attrited cocatalyst composition and titanium tetrachloride are introduced into a polymerization reactor with preferably from 100 to 2000 parts by weight of hydrocarbon diluent calculated on total catalyst. To this mixture is then suitably added 20 to 300 grams of ethylene per gram of total catalyst. The reaction mixture is then heated to a temperature of from about 50 to 120° C., preferably 70 to 100° C., and maintained at this temperature from about 0.1 to 10 hours, preferably 0.5 to 4 hours, during which time more monomer may be added so as to maintain the monomer concentration and the total pressure in the reactor at the desired level, which is preferably in the range of about 50 to about 500 p.s.i.g. The amount of ethylene added will, of course, be determined by catalyst activity, reaction time, diluent volume, desired monomer concentration, etc. Normally, it is desirable to maintain the polymer concentration in the diluent at levels less than 25 wt. percent. If necessary, the polymer concentration may be maintained at or below this level by addition of more diluent during the polymerization.

The polymerization may, of course, also be conducted in a continuous manner, in which case the titanium tetrachloride and the ball milled components are slurried in sufficient diluent and introduced to the reactor either separately or previously combined. Separate streams of additional diluent and monomer are also continuously fed to the reactor to maintain a suitable polymer concentration in the diluent, preferably in the range of 5 to 25 wt. percent, to achieve desirable monomer concentration, and to obtain a high catalyst efficiency.

In the case of either batch or continuous operations, the solid polymer is precipitated from the reaction diluent and partially de-ashed by the addition to the total polymer slurry of approximately an equal quantity of a lower alkanol such as ethyl alcohol, n-butanol and the like in the relative absence of oxygen. The precipitated product is then filtered and washed with either additional alcohol or water which preferably contains hydrogen chloride or other suitable acid to facilitate the de-ashing operation. The filtration and de-ashing step may be repeated one or more times if needed to obtain desirably low ash levels. The polymer may then be finished by the addition of suitable stabilizers and inhibitors followed by drying according to methods well known in the art.

This invention and its advantages will be better understood by reference to the following examples:

EXAMPLE 1

To demonstrate the effectiveness of the process of the present invention, several test runs were completed wherein either aluminum, aluminum chloride and ammonium chloride were rigorously ball milled together or only aluminum powder and aluminum chloride were ball milled together and then used with titanium tetrachloride for the polymerization of ethylene. The catalyst mixtures were prepared by mixing the ball milled components and the titanium tetrachloride in one liter of dry normal heptane in a one liter addition funnel. The catalyst-diluent mixture was then transferred to a magnetically agitated 2-liter stainless steel Recipromix unit. Ethylene was introduced into the reactor at room temperature to a pressure of about 60 p.s.i.g. The reactor was then heated to the temperature indicated in the table and maintained at this temperature for one hour under continuous agitation. More ethylene was added to the reactor from the moment the temperature reached the desired level and until the termination of the reaction to maintain the pressure within the reaction vessel between about 90 and 100 p.s.i.g. The polymerization was terminated by the addition of a small amount of isopropyl alcohol and worked up as outlined above. Samples of the polymer thus obtained were then tested for molecular weight and density. The results of the tests are set forth in Table I below.

TABLE I

| Run | 1 | 2 | 3 | 4 | 5 | 6 | 7 |
|---|---|---|---|---|---|---|---|
| Catalyst: | | | | | | | |
| Al Powder: | | | | | | | |
| Type [a] | [b] (20/7/6) | [b] (8/1) | [b] (8/1) | [b] (8/1) | [c] (8/1) | [c] (8/1) | [c] (3/1) |
| Weight, g.[d] | 0.217 | 0.10 | 0.21 | 0.29 | 0.11 | 0.13 | 0.29 |
| AlCl$_3$, g | [e] 0.614 | [f] 0.26 | [f] 0.46 | [f] 0.48 | [f] 0.56 | [f] 0.32 | [g] 0.48 |
| TiCl$_4$, g | 1.35 | 0.54 | 1.36 | 1.35 | 0.68 | 0.68 | 1.35 |
| NH$_4$Cl, g | [h] 0.129 | | | | | | |
| Al/AlCl$_3$/TiCl$_4$, Molar Ratio | [i] 1.75/1/1.55 | 2/1/1.5 | 2/1/2 | 3/1/2 | 1/1/1 | 2/1/1.5 | 3/1/2 |
| Reaction Conditions: | | | | | | | |
| n-Heptane, l | 1 | 1 | 1 | 1 | 1 | 1 | 1 |
| Temperature, ° C | 90 | 90 | 90 | 90 | 92 | 92 | 90 |
| Pressure, max., p.s.i.g | 100 | 100 | 100 | 100 | 100 | 100 | 100 |
| Pressure, min., p.s.i.g | 90 | 90 | 90 | 90 | 90 | 90 | 90 |
| Run length, hr | 1 | 1 | 1 | 1 | 1 | 1 | 1 |
| Results: | | | | | | | |
| Solid Polymer, g | 310 | 36 | 60 | 86 | 20 | 92 | 53 |
| Catalyst Efficiency, g./g.: | | | | | | | |
| On Total Catalyst [j] | 134 | 25 | 30 | 41 | 15 | 82 | 25 |
| On TiCl$_4$ only | 230 | 67 | 44 | 63 | 29 | 135 | 39.3 |
| Properties of Solid Polymer: | | | | | | | |
| Mol. Wt. ×10$^{-3}$ [k] | 155 | 170 | 93 | 130 | 255 | 143 | 255 |
| Density, g./cc | 0.963 | 0.955 | 0.954 | 0.947 | | | 0.956 |

[a] Notations within parentheses indicate the Al/AlCl$_3$ or Al/AlCl$_3$/NH$_4$Cl ratios used during the ball milling of the Al containing component.
[b] Ball milled for 14 days in a ½-gallon steel jar.
[c] Ball milled for 14 days in a 2-gallon steel jar.
[d] Weight of the aluminum portion in the ball milled mixtures.
[e] Added in part as 20Al-7AlCl$_3$-6NH$_4$Cl mixture.
[f] Added in part as 8Al-1AlCl$_3$ mixture.
[g] Added as 3Al-1AlCl$_3$ mixture.
[h] Added as 20Al-7AlCl$_3$-6NH$_4$Cl mixture.
[i] Corresponds to a "3/1/2" catalyst if the following reaction takes place during the ball milling: 20Al+7AlCl$_3$+6NH$_4$Cl→16Al+2AlH$_3$+3AlCl$_3$+3AlCl$_3$+6H$_3$N:AlCl$_3$.
[j] Includes NH$_4$Cl when present.
[k] According to the Chiang equation (J. Polymer Sci. 36, 91 (1959)).

From the data set forth above, it can be seen that the catalyst system consisting of titanium tetrachloride and a cocatalyst mixture formed by ball milling together aluminum powder, aluminum chloride and ammonium chloride (Run 1) served to promote the formation of considerably more polymer than was obtaine din Runs 2–7 where only ball milled aluminum and aluminum chloride was used as the cocatalyst. When comparing the polymerization results it should be borne in mind that the 20Al-7AlCl$_3$-6NH$_4$Cl preparation used in Run 1 was ball milled under less advantageous conditions than the Al-AlCl$_3$ preparations used in Runs 2–7. The grinding efficiency will generally increase with increasing ball mill size and increasing Al/AlCl$_3$ ratio as disclosed and demonstrated in the copending patent application S.N. 161,-353 (page 5, line 9 to page 7, line 14). The Al/AlCl$_3$ ratio employed during the milling was 8 for Runs 2–6 as compared to 2.86 for Run 1. Additionally, 2 gallon steel jars were used for Runs 5–7 as compared to ½ gallon jars for Runs 1–4.

The catalyst of Run 1 becomes a 3/1/2 (Al/AlCl$_3$/TiCl$_4$) catalyst if complete reaction according to the equation previously set forth takes place during the milling operation; however, a comparison with Runs 4 and 7 again reveals the superiority of ball milling the ammonium chloride, aluminum powder and aluminum chloride together prior to introduction into the polymerization zone.

EXAMPLE 2

To further demonstrate the effectiveness of the process of this invention, several tests were conducted wherein ammonium chloride was ball milled together with aluminum and aluminum chloride and used as the cocatalyst of the catalyst system and other tests carried out wherein aluminum powder and aluminum chloride were ball milled alone and subsequently mixed with ammonium chloride and used as the cocatalyst of the polymerization system. Each of the tests were conducted in a 283 milliliter steel bomb containing 150 milliliters of n-heptane diluent. Initially, ethylene was introduced into the bomb in amounts listed in the table below. During the course of the polymerization further amounts of ethylene were introduced into the bomb to maintain a predetermined pressure level. The polymerization was terminated by the addition of a small amount of a lower alkanol and the polymer worked up as outlined before. After the polymer was thoroughly dried, samples of the polymer from each run were tested for molecular weight, density and melting point. The results of the experiments are set forth in Table II below.

of the ammonium chloride with the traditional aluminum components of the Fischer catalyst system increases the catalyst efficiency by 32 to 66% as compared to direct addition of the ammonium chloride to the polymerization reactor. The difference in catalyst efficiency becomes even more striking if one takes into account that the Al-AlCl$_3$ mixtures employed in Runs 9 and 11 had been subjected to much more severe grinding than the Al-AlCl$_3$-NH$_4$Cl mixtures of Runs 8 and 10.

The advantages of this invention will be apparent to those skilled in the art. Improved catalyst systems are provided to obtain plastic grade polyethylene of attractive physical properties at very high catalyst efficiencies. It is to be understood that this invention is not limited to the specific examples which have been offered merely as illustrations and that modifications may be made without departing from the spirit of the invention.

What is claimed is:

1. In a process for preparing polyethylene by contacting ethylene at polymerizing conditions with a catalyst comprising aluminum, aluminum chloride, ammonium halide and a transition metal tetrahalide, the improvement which comprises milling together said (a) aluminum and (b) aluminum chloride in a ratio of 1–12 and 0.1–3 moles respectively per mole of transition metal tetrahalide with 10–500 mg. of said (c) ammonium halide per gram of total aluminum, aluminum chloride and transition metal halide catalyst prior to contact with ethylene.

2. The process of claim 1 wherein said ammonium halide is ammonium chloride.

3. The process of claim 2 wherein said transition metal is titanium.

TABLE II

| Run | 8 | 9 | 10 | 11 |
|---|---|---|---|---|
| Catalyst: | | | | |
| Al Powder: | | | | |
| Type [a] | b (37/8/3) | c (5/1) | b (20/7/6) | b (8/1) |
| Weight, mg.[d] | 21.6 | 21 | 41.7 | 37.5 |
| AlCl$_3$, mg.[e] | 27.1 | 21 | 71.9 | 63 |
| TiCl$_4$, mg | 88 | 88 | 88 | 88 |
| NH$_4$Cl, mg.[f] | 3.5 | 13 | 24.8 | 25 |
| Al/AlCl$_3$/TiCl$_4$, Molar Ratio | g 3.93/1/2.28 | 5/1/3 | h 2/1/0.6 | 3/1/1 |
| Reaction Conditions: | | | | |
| Ethylene Initially Added, g.[i] | 10.5 | 12 | 10.5 | 24 |
| Initial Pressure at Room Temp., p.s.i.g | 105 | 190 | 155 | 210 |
| Max. Pressure, p.s.i.g | 200 | 245 | 540 | 500 |
| Av. Pressure, p.s.i.g | 150 | 140 | 525 | 480 |
| Run Length, hrs | 2 | 2 | 4 | 4 |
| Av. Temperature, °C | 80 | 80 | 150 | 150 |
| Results: | | | | |
| Solid Polymer, g | 16.2 | 9.7 | 25.5 | 16.0 |
| Catalyst Efficiency, g./g.: | | | | |
| On Total Catalyst [j] | 115.3 | 67.8 | 98.7 | 75 |
| On TiCl$_4$ Only | 184 | 97 | 290 | 188 |
| Properties of Solid Polymer: | | | | |
| Molecular Weight×10$^{-3}$ [k] | 340 | 185 | 675 | 1,260 |
| Density, g./cc | 0.951 | 0.951 | 0.967 | 0.957 |
| M.P., °C | 138 | 138 | 138 | 139 |

[a] Notations within parentheses indicated the Al/AlCl$_3$ or Al/AlCl$_3$/NH$_4$Cl ratio used during the ball milling of the Al containing component.
[b] Ball milled for 14 days in a ½-gallon steel jar.
[c] Ball milled for 14 days in a 2-gallon steel jar.
[d] Weight of the aluminum portion in the ball milled mixtures.
[e] Added in part as ball milled Al-AlCl$_3$ or Al-AlCl$_3$-NH$_4$Cl mixtures.
[f] Added as Al-AlCl$_3$-NH$_4$Cl mixture.
[g] Corresponds to a "5/1/3" catalyst if the following reaction takes place during ball milling: 37Al+8AlCl$_3$+3NH$_4$Cl→35Al+AlH$_3$+6AlCl$_3$+3H$_3$N:AlCl$_3$.
[h] Corresponds to a "3/1/1" catalyst if the following reaction takes place during ball milling: 20Al+7AlCl$_3$+6NH$_4$Cl→16Al+2AlH$_3$+2AlCl$_3$+6H$_3$N:AlCl$_3$.
[i] More ethylene was added during the polymerization to maintain the pressure at a predetermined level.
[j] Includes NH$_4$Cl when present.
[k] According to the Chiang equation (J. Polymer Sci. 36, 91 (1959)).

The data above again demonstrates the superiority of ball milling the ammonium chloride with the aluminum catalyst components (Runs 8 and 10) as opposed to adding the ammonium chloride directly to the previously ball-milled aluminum catalyst components contained in the polymerization reaction (Runs 9 and 11). Although bomb polymerizations, as employed in Runs 8 to 11, often give high monomer conversions with moderately active catalysts and tend to underplay differences in catalyst activity, the data in Table II clearly shows that the ball milling 4. The process of claim 1 wherein said ammonium halide is ammonium bromide.

5. In a process for preparing predominantly solid polyethylene by contacting ethylene in a hydrocarbon diluent at a temperature in the range of from about 50 to 120° C. with catalyst comprising aluminum, aluminum chloride, ammonium halide, and a titanium tetrahalide, the improvement which comprises vigorously milling together said (a) aluminum and (b) aluminum chloride in a ratio of 1–12 and 0.1–3 moles respectively per mole of transition metal tetrahalide with 10–500 mg. of said (c) ammonium halide per gram of total aluminum, aluminum chloride, and transition metal halide catalyst prior to contact with ethylene.

6. The process of claim 5 wherein said milling operation is conducted in a ball mill in the absence of diluents.

7. The process of claim 6 wherein said ammonium halide is ammonium chloride.

8. The process of claim 6 wherein said ammonium halide is ammonium bromide.

9. The process of claim 7 wherein said titanium tetrahalide is titanium tetrachloride.

10. In a process for preparing predominantly solid polyethylene by contacting ethylene in a hydrocarbon diluent at a temperature in the range of from about 70 to 100° C. with a catalyst comprising titanium tetrachloride, 1 to 4 moles of aluminum per mole of titanium tetrachloride, 0.2 to 3 moles of aluminum chloride per mole of titanium tetrachloride, and 25 to 200 mg. of ammonium chloride per gram of titanium tetrachloride, aluminum, and aluminum chloride, the improvement which comprises vigorous steel ball milling together in the absence of diluents said (a) aluminum and (b) aluminum chloride in a ratio of 1–12 and 0.1–3 moles respectively per mole of transition metal tetrachloride with 10–500 mg. of said (c) ammonium halide per gram of total aluminum, aluminum chloride and transition metal halide catalyst prior to contact with ethylene.

References Cited

UNITED STATES PATENTS

| 3,269,996 | 8/1966 | Langer | 200—93.7 |
| 3,203,946 | 8/1965 | Kirshenbaum | 260—94.9 |

JOSEPH L. SCHOFER, *Primary Examiner.*

M. B. KURTZMAN, *Assistant Examiner.*